Jan. 4, 1927. L. BILLÉ Re. 16,523

PIPE, TUBE, AND THE LIKE AND METHOD OF AND APPARATUS FOR MAKING THE SAME

Original Filed April 24, 1922 3 Sheets-Sheet 1

INVENTOR
Léon Billé
BY
Joseph T. O'Brien
His ATTORNEY

Jan. 4, 1927. L. BILLÉ Re. 16,523
PIPE, TUBE, AND THE LIKE AND METHOD OF AND APPARATUS FOR MAKING THE SAME
Original Filed April 24, 1922 3 Sheets-Sheet 2
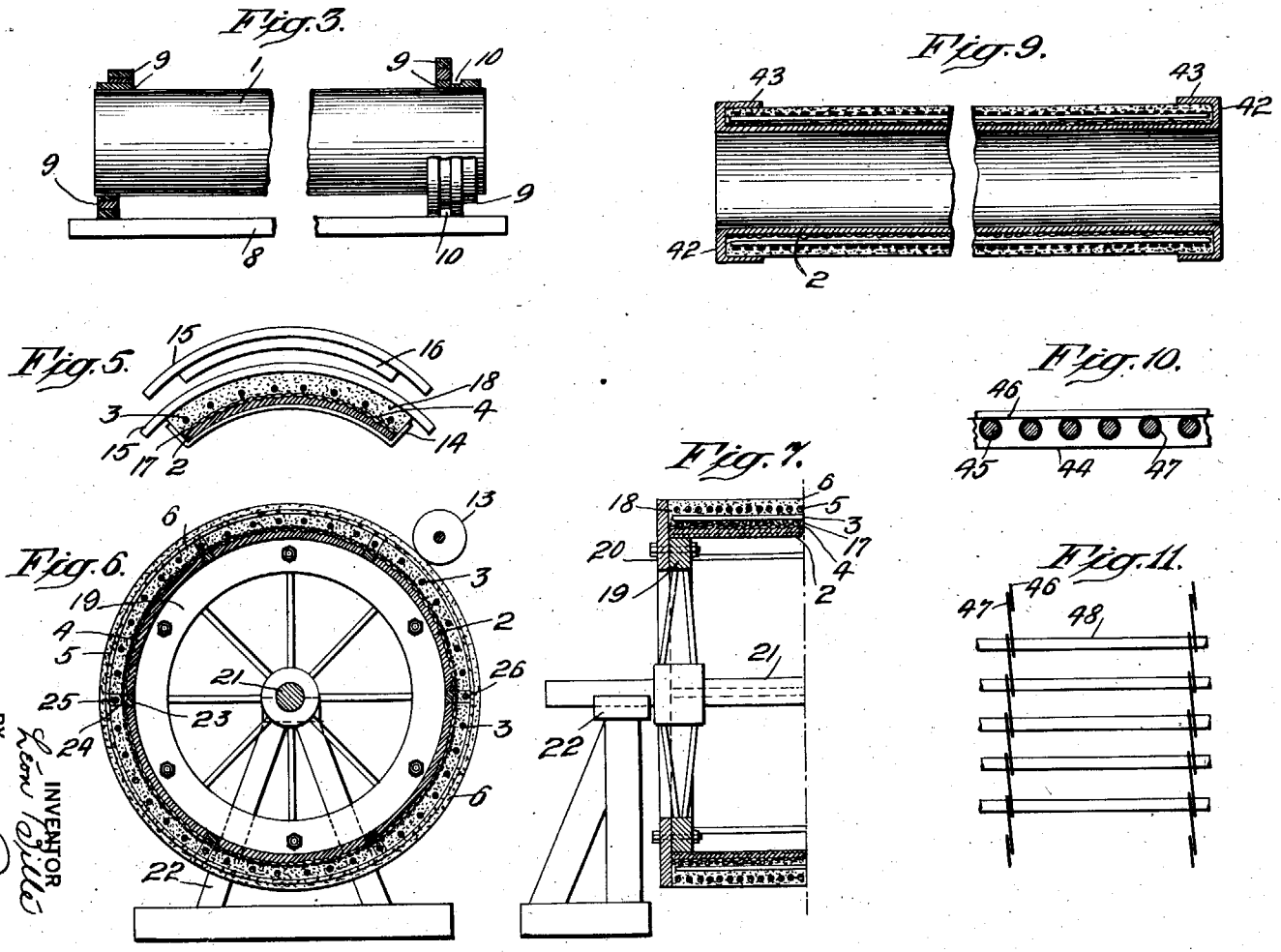
INVENTOR
Léon Billé
BY
Joseph F. O'Brien
His ATTORNEY Jan. 4, 1927. Re. 16,523

L. BILLÉ

PIPE, TUBE, AND THE LIKE AND METHOD OF AND APPARATUS FOR MAKING THE SAME

Original Filed April 24, 1922 3 Sheets-Sheet 3

Leon Billé INVENTOR

BY

Joseph H. O'Brien Otto ATTORNEY

Reissued Jan. 4, 1927.

Re. 16,523

UNITED STATES PATENT OFFICE.

LÉON BILLÉ, OF NOGENT-SUR-MARNE, FRANCE.

PIPES, TUBES, AND THE LIKE AND METHOD OF AND APPARATUS FOR MAKING THE SAME.

Original No. 1,499,719, dated July 1, 1924, Serial No. 556,281, filed April 24, 1922. Application for reissue filed January 26, 1926. Serial No. 83,968.

This invention has for its subject-matter a method of making pipes, tubes and the like of asphalt and reinforced cement, said cement being in some cases obtained by melting.

The invention is clearly illustrated in the accompanying drawings, in which:—

Fig. 3 is a fragmentary elevational view of a mandrel with gaging rollers thereon;

Fig. 5 is an elevational detail of one section of a sectional mould forming a pipe in accordance with the improved process;

Fig. 6 is a transverse sectional view through a sectional pipe in the course of construction;

Fig. 7 is a fragmentary longitudinal sectional view partly in elevation of the same form;

Fig. 9 is a longitudinal sectional view of an improved pipe section;

Fig. 10 is a transverse sectional detail of a longitudinally disposed reinforcing rod;

Fig. 11 is a plan detail thereof;

Figure 1:
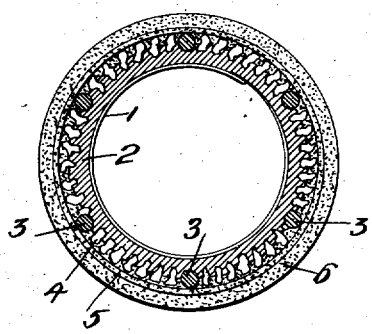
Fig. 1 is a transverse sectional view of one form of tube constructed in accordance with the improved method.

A tube, Figure 1, of asphalt, bitumen or other analogous material is first formed round an extensible mandrel or core 1, or round a light conical tube 1 either by dipping the mandrel or core previously covered with a sheet of paper impregnated or saturated with asphalt, bitumen shale oil, tar, etc., in a hot molten asphalt, or by pouring, applying or spreading one or more than one layer of molten asphalt on or round the said mandrel or core, or by rolling the mandrel or core on a layer of asphalt previously spread on a platform heated to a suitable temperature by steam, hot water, gas burners or by any other suitable means. On rolling the mandrel or core on the asphalt the latter adheres to the said mandrel or core and the joint may be smoothed over or made good by means of a hot iron with or without the use of asphalt. A preliminary or first layer or thickness of molten asphalt mastic containing limestone, sand, etc., may be poured or spread on the mandrel or core; or a preliminary or first layer of hot powdered asphalt or a first or preliminary layer of hot asphaltic concrete composed of small fragments or pieces of porphyry, flint, etc., sand and asphalt. The powdered asphalt or the concrete is rammed and smoothed by means of suitable hot or cold tools in order to obtain the desired thickness. This first layer of powdered asphalt or asphaltic concrete adheres only very slightly to the paper or to the isolating material placed on the mandrel or core. According to the proportion of asphalt in the mixture, the isolating material may be dispensed with. A second layer of asphalt richer in bitumen is subsequently applied on the first layer, the whole is then subject to rolling or is rolled if so desired on a platform 8, Figure 3, which if desired may be heated the thickness being gauged by means of rings 9 of suitable form which rings are mounted on the ends of the mandrel or core.

Figure 8:
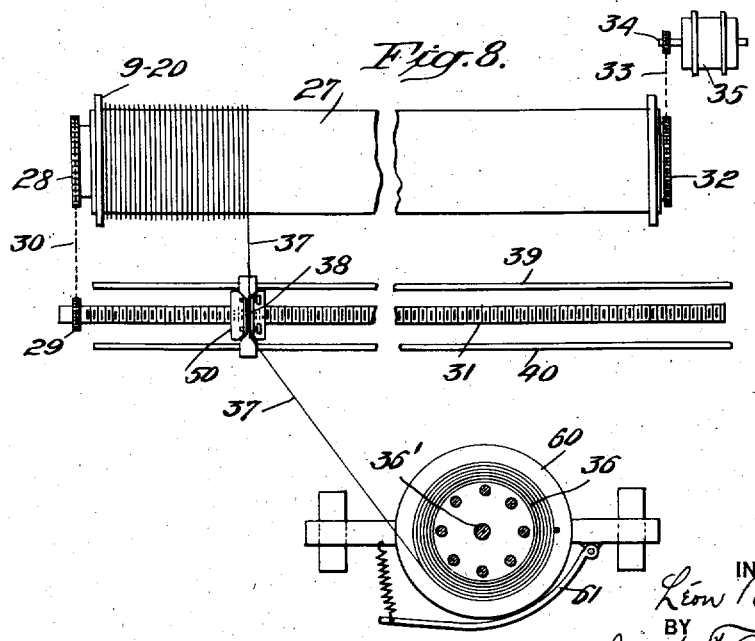
Fig. 8 is a top plan detail of a wire winding mechanism.

If so desired a single water tight layer of asphalt may be used. The rolling may be replaced by a smoothing or fairing action by means of a suitable tool or tools which may be hot or cold. Any suitable number of iron or steel bars or rods 3 are placed at suitable intervals apart round the asphalt tube 2, Figure 1, these bars or rods being arranged parallel to the axis of the tube. For this purpose the bars or rods have been previously engaged in loops or eyes suitably spaced apart on small transversely arranged iron wires. By subsequently attaching or connecting the ends of the wires extending round the tubes, the bars or rods may be positioned round the said tube by a single movement. These longitudinal bars or rods form the framework or skeleton of the tube during construction. The asphalt tube fitted with these bars or rods is then rolled on a heated platform on which is spread a layer of hard stone fragments such as flint, porphyry, quartz or corundum, lava or quarrystone, coke; scoria or clinker etc. 4, Figure 1. These materials previously heated may be spread and applied on the tube either by hand or by means of the apparatus illustrated in Figures 12 and 13. The gravel or pieces of stone thus heated partly penetrate into the exterior of the asphalt tube 2 between the longitudinal steel bars or rods and adhere strongly to the asphalt after cooling, and as care has been taken to add an additional ring 9, Figure 3, to the end of the mandrel or core so as to increase the thickness of gauge, or to replace the ring or rings which has or have already served as a gauge for the thickness of the asphalt, by other rings adapted to give the desired thickness, a tube of asphalt containing gravel or stones may thus be formed by rolling, the exterior surface of the tube being of a perfectly cylindrical form. Cooling is now effected by watering. The thickness gauging rings are now changed or a different thickness of rings 9 is added and the tube is placed on two cradles each comprising two rollers 12, Figure 4, with or without ball bearings, the thickness gauging rings for the tube bearing on these rollers. The rings 9 for this purpose may be provided with a peripherally extending groove or recess 10, Figure 3, in which the rollers engage. The tube is then turned by hand with a crank or a hand wheel, or mechanically as shown in Figure 8, and an iron or steel wire 5 is wound thereon from above, the section and the distance apart of the turns or convolutions of the wire being determined so as to resist the interior pressure which the tube will have to support.

After winding of the steel or iron wire 5, a first layer of pure cement or of thin cement mortar, that is to say, of a very fluid consistency, is applied on the tube, or by immersion of the tube in a bath of pure cement or of very fluid cement mortar. The tube now somewhat moist is then rolled on a platform provided with a layer of cement mixed dry with sand or on a layer of cement mortar 6 mixed to a very firm consistency. The cement mortar adheres to the turns or convolutions of the helically wound steel or iron wire and to the gravel or small stones or pebbles and penetrates into the interstices and the empty spaces of the material right up to the layer of asphalt. The thickness of the layer of mortar and the almost perfect exterior cylindricity of the tube are strictly determined by the gauging rings. The mortar for a short time is allowed to set, then the rings 9 are removed and the mandrel or the tube 1 which has served as a core is withdrawn. The interior layer of asphalt hardens or sets very quickly by cooling while the stones are watered and the casing is rolled in cement mortar. The removal of the mandrel or core can be effected very quickly. The layer of cement mortar may also be previously spread on a rubberized sheet, or on a piece of linoleum or on a sheet 7, Figure 2, of any suitable flexible material and by rolling the tube provided with stones or gravel and wire windings on the said layer of cement mortar the sheet 7 guides the cement mortar and facilitates the adherence thereof round the tube. The aforesaid sheet is withdrawn as soon as the mortar becomes self-adherent to the tube. The tube provided with stones or gravel and wire winding may again be enveloped with the aforesaid sheet and rolled on the platform 8 or it may be subjected to the rolling action of a cylinder 13, Figure 4.

Figure 4:
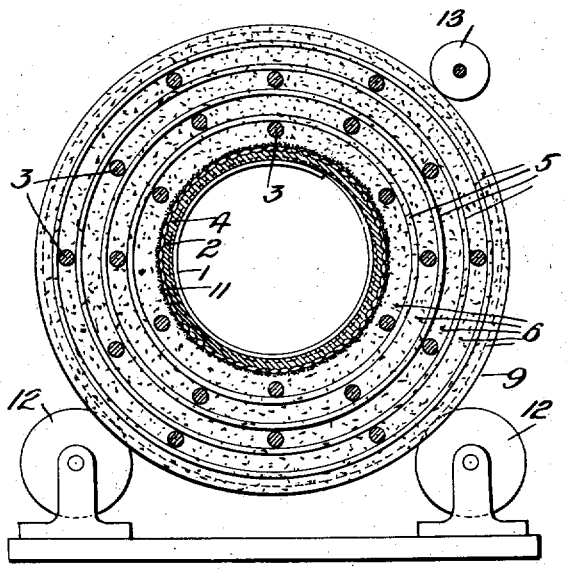
Fig. 4 is a transverse sectional view of a modified form of pipe in the process.
Figure 12:
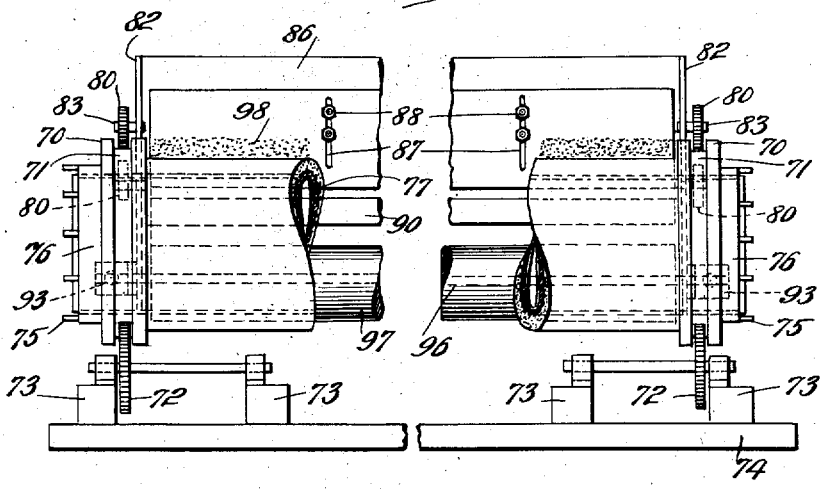
Fig. 12 is an elevational view partly in section of the apparatus for carrying out the improved method forming the pipe construction shown in Fig. 1.
Figure 13:
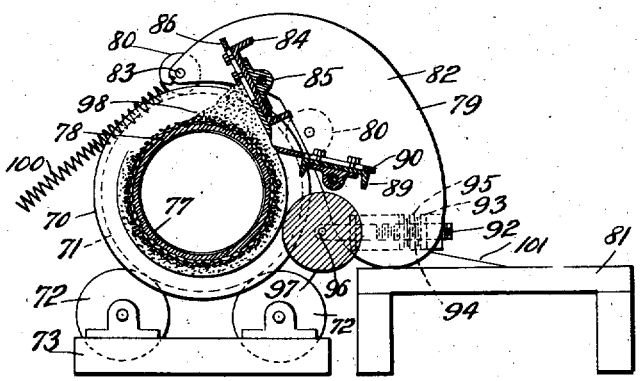
Fig. 13 is a transverse sectional view thereof.

Instead of directly placing the longitudinal steel bars or rods 3 on the asphalt tube, before positioning or laying the gravel or stones 4, the asphalt tube with the mandrel or core provided with suitable thickness gauging rings, may be rolled on a heated platform having spread thereon a layer of gravel or stones; or again, whilst the mandrel or core is supported through the thickness gauging rings on the rollers 12, Figure 4, the gravel or stones in a hot condition may be spread on or applied to the asphalt tube either by hand or with the apparatus shown in Figures 12 and 13. The heat thereof partly melts the asphalt so that the gravel or stones become embedded or sink into the asphalt and they adhere strongly thereto on cooling. The mass is then watered and a preliminary or first layer of cement mortar 11, Figure 4, is applied on the gravel or stones and the cement mortar is caused to penetrate into the spaces between the gravel particles and the stones right up to the layer of asphalt. The layer of mortar is now rolled on a platform or table or the said layer of mortar is subjected to rolling by the roller 13, Figure 4, or by the apparatus shown in Figures 12 and 13 so as to make the layer uniform. Then the longitudinal bars or rods 3 forming the skeleton or framework previously attached at suitable distances apart to the transverse iron wires are placed in position and the said wires are then disposed round the pipe. A new layer of cement mortar of a very firm consistency is applied between the bars or rods 3, which layer may be rolled or subjected to rolling. If necessary, this layer of mortar is allowed to set then the steel wire 5 is wound thereon by hand, or mechanically, the convolutions or turns of the helically wound wire forming the constructive guide ribs or equivalent of the pipe.

Another layer 6 of the mortar cement is subsequently applied either by rolling or otherwise as by hand. A further number of bars or rods such as 3 may obviously be placed in position thereon then a layer 6 of cement mortar, and then a further layer of wire winding which may be covered with a layer of cement mortar and this may be rolled or subjected to rolling so that the tube may be continuously reinforced in this manner with bars or rods 3 and helically wound wire, successively encased in a layer of cement mortar in order to impart the desired or necessary resistance to the tube. Additional or further layers of asphalt and gravel may if so desired be interposed between the layers of reinforced cement.

During these various operations, the thickness gauging rings 9 are changed to meet requirements or new rings are added thereto in order that the roller 13 (or the platform or table 8) rolling on these rings may carefully gauge the thickness of the different layer of cement mortar and thus ensure perfect centering of the helically disposed wires or constructive guide ribs of the pipe as well as the almost perfect cylindricity of the exterior surface of the finished pipe or tube. The apparatus shown in Figures 12 and 13 may be used for the application of the hot gravel and cement mortar. The mandrel or core is withdrawn as soon as the pipe or tube has set sufficiently to prevent radial distortion thereof, that is to say, sufficiently hard to prevent the tube or pipe becoming oval instead of remaining cylindrical.

If desired use may be made of a brush heated by electricity or other suitable means which maintains the asphalt in a hot condition during the spreading operation. This spread may be used to spread the single layer of pure asphalt or an asphalt rich in bitumen on the mandrel where one layer only of asphalt is used; or the said brush may be used to spread the second layer of asphalt on the first thickness of powdered asphalt or of asphaltic concrete in the case where the tube is formed of several layers.

In order that the longitudinal bars or rods forming the skeleton or framework or constructive ribs of the pipe or tube may be readily and quickly placed in position round the asphalt core with or without gravel and cement mortar the following arrangement may be used. The ends of bars 45 of a suitable diameter are secured in and along the length of a beam 44, Figure 10, the said bars being spaced the same distance apart as the guide ribs when subsequently placed round the pipe or tube. A wire 46 of soft iron or mild steel is passed round the ends of the bars so as to form a loop or eye 47 round each bar. The wires 46 are withdrawn and they are then threaded or slipped onto the bars 48 which form the constructive ribs of the pipe or tube, Figure 11. A metallic frame shown partly in Figure 11 is thus obtained which frame in one piece is placed round the core. A metallic sheet, Figure 11, can thus be obtained by placing the parallel bars in holes or slots suitably spaced apart according to requirements and engaging the loops or eyes 47 directly with the bars. By joining and attaching the ends of the wires 46, it will be possible to secure all the bars or constructive ribs round the core at one movement.

Instead of making the interior asphalt tube provided with gravel or stones in one piece and longitudinal bars encased in cement mortar, the following method may be adopted more especially for pipes or tubes of large diameters.

A sheet of paper impregnated or saturated with asphalt, bitumen, shale oil, tar, etc., is placed in moulds or formers 14, Figure 5, disposed horizontally, the curvature of the said moulds or formers corresponding to the curvature of the pipe or tube to be formed. A first layer 2 of asphalt mastic, or else hot calcareous asphalt crushed or broken is applied and rammed, or asphaltic concrete made hot either by penetration of molten asphalt round the stones or by mixing in the hot condition asphalt, sand and stones or pebbles. Then a second layer of asphalt mastic richer in bitumen and dry is applied; or again a single watertight layer of asphalt mastic may be applied. This is smoothed with a suitably curved wooden or iron tool 16, Figure 5, cold or heated electrically or by any other suitable means; which tool is attached to a curved board 15, Figure 5, capable of sliding on the edges of the mould or former 14. The thickness of the tool 16 is such as to give a uniform thickness to the asphalt 2. The layer 2 of asphalt may be readily and simply smoothed with a tool of wood or hot or cold iron. A layer of gravel (or hot stones) is subsequently spread on the asphalt, the gravel (or hot stones) penetrating into the asphalt. The mass is watered and a thin layer 17 of cement mortar is applied which fills up the spaces between the particles or stones right up to the layer of asphalt. The thickness of this layer of cement mortar is gauged by means of a depth piece 16 attached to the curved member or board 15, Figure 5. On the cement mortar is placed a number of iron or steel bars 3, Figure 5, which form the framework or constructive ribs of the pipe or tube to be formed. These bars are placed in the loops or eyes 47 of the transverse wires 46, which maintain them at suitable distances apart, Figure 11. The mould or former is then filled with cement mortar 18 the thickness of which is carefully gauged by the curved member 15 slidably mounted on the edges of the mould or former. The cast is removed from the mould or former after setting. Arcuate segments or elements of the tube are thus obtained which are temporarily mounted and attached on two ordinary or extensible wheels 19, Figures 6 and 7, which are mounted on a rotatable shaft 21 supported on uprights 22, either in the factory or works or in situ at the place where the tubes or pipes are required.

Where the construction of the pipes or tubes requires the use of a trench the uprights 22 are much shorter than a radius of the pipe or tube so that one of the uprights may be supported in the interior of a part of the finished tube preceding the tube to be subsequently constructed, and the second upright would then be supported on a suitable temporary bracket, block or equivalent.

The two wheels are provided with end rings or end discs 20, Figure 7, by which the thickness can be gauged. The asphalt mastic is run in, or the powdered asphalt or the hot asphaltic concrete 23 is rammed in between the layer of asphalt or asphaltic concrete of two consecutive segments or elements by placing a board or equivalent under the joint which board or equivalent is withdrawn after cooling. The asphalt run in or applied hot or the hot asphaltic concrete binds itself with that of the arcuate segments or elements and in order to ensure the tightness of the joint, a second layer of pure molten asphalt is run in if deemed desirable which may be smoothed over with a hot iron of suitable form. The asphalt joint is then covered with gravel or hot stones 24, Figure 6, and a layer of cement mortar 26 is applied on the layer 24 of gravel or hot stones, Figure 6, a bar 25 of steel or iron being embedded therein if so desired. The joint of cement is made flush by means of a board or equivalent with the exterior surface of the arcuate segments or elements of the pipe or tube. The various operations of the longitudinal joints between the arcuate segments or elements are always effected above the tube or pipe and the wheels 19 are turned gradually as required. The tube thus formed by the assembly of the arcuate segments or elements is wound with iron or steel wire 5, Figure 7, the section and pitch of the turns or convolutions of the wire being previously determined so as to give the desired resistance to the pipe or tube. The aforesaid helical wire winding may be effected by hand or mechanically as indicated in Figure 8. The tube or pipe is finished by the application thereto of a layer of cement mortar 6 which may be subjected to a rolling action by the cylinder 13 or by the apparatus, Figures 12 and 13, rolling or turning on the thickness gauging rings 20. The arcuate segments or elements may be of any suitable or desired number. Another series of longitudinal bars or constructive ribs and helically arranged wires may be superposed round the pipe or tube with as many layers of cement as desired, the thickness of the gauging rings being gradually changed to meet requirements or new rings being added as found most convenient; changing of the thickness gauging rings may be avoided by the use of the apparatus shown in Figures 12 and 13 which permits of the several layers of helical wire and layers of cement being perfectly concentric. Further layers of asphalt may be interposed between the layers of reinforced cement.

When the tube or pipe is finished and the cement has set sufficiently hard the said tube or pipe is shored up from below so as to wedge it in place. The spindle or shaft 21 is then withdrawn likewise the thickness gauging rings 20 one of which escapes or falls off by reason of the play allowed for the expansion of the joint between the preceding pipe or tube and the pipe or tube which has just been finished. The extensible wheels 19 are then removed and finally the uprights or trestle support. All these operations can be effected at the bottom of a hollow or dug-out trench the depth of which is sufficient to allow the pipe or tube to be turned.

Figure 2:
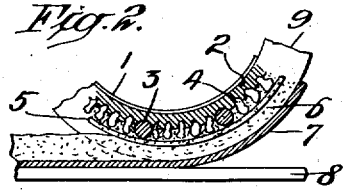
Fig. 2 is a fragmentary transverse sectional view illustrating the steps of applying and rolling the outer layer of asphalt.

The cement mortar can also be applied round the tube or pipe formed by the arcuate segments or elements assembled round the wheels 19 where the manufacture is effected outside of the trench, by rolling it on a platform provided with cement mortar with or without the aid of the sheet 7, Figure 2. For the construction of the asphalt tube, sheets of cloth, jute, etc., prepared in advance may be used, or felt impregnated with asphalt and macadamized or provided on one face with gravel, pebbles or stones may be used. The mandrel is surrounded with these sheets the smooth side being inwards and the stony side outside and the joints are united either by a cover joint of asphalt coated with cold soluble asphalt, or with molten asphalt which may be smoothed over with a suitable hot or cold tool. Sheets of macadamized asphalt may be used for the interior lay of asphalt in the manufacture of arcuate segments or elements for tubes or pipes of large diameters. The sheets of asphalt may even be prepared in advance with or without reinforcements, macadamize them hot on one side and bend or shape them on the mandrel or mould them and join them at the junction as hereinbefore described. In certain special cases the asphalt mastic as well as the cement mortar may have incorporated therein pumice stone or powder or other light material in place of sand, so as to produce a lighter pipe or tube.

Figure 8 shows the method of mechanically winding the steel wire on the tubes or pipes 27 in accordance with the method hereinbefore described. On the thickness gauging ring 9 or 20 is secured a toothed wheel or a pulley 28. A screw-threaded shaft 31 carries a pinion 29 actuated by a chain or a belt 30 passing round the wheel 28. A coil or reel 36 of steel wire is placed on a platform or table 60 provided with a spindle or shaft 36′. A brake 61 is employed to modify the speed of the platform or table 60. The wire 37 passes between the jaws of a vice 38 by means of which the desired tension can be given to the wire. This vice is fixed on a carriage 50 sliding along the screw 31. This vice 38 is guided on two parallel bars or rods 39 and 40. A toothed wheel or pulley 32 is keyed on the other thickness gauging ring, which wheel or pulley is connected by a chain or belt 33 to a pinion 34 keyed on the motor shaft 35 or other suitable power transmission device. The motor drives the tube 27 on the other wheel 28 of which effects the rotation of the screwed spindle 31. The latter in its rotation causes the automatic advance of the carriage 50 and the vice 38 carried thereon during the winding of the wire 37 on the tube 27 into the form of a helical coil, the distance apart or the pitch of the convolutions or turns of the helical coil being determined by the speed in conjunction with the pitch of the threads on the screw-threaded spindle 31. A change speed gear box analogous to that of parallel or slides lathes may be adapted for use with the aforesaid arrangement for winding the wire, so as to obtain the usual speeds and pitches by the simple manipulation of levers.

Whatever may be the method of manufacture of the tubes or pipes hereinbefore described when these are finished and the cement mortar has completely set, very hot asphalt or a solution of cold asphalt is applied to th extremities 42 and the ends 43, or a sheet of smooth asphalt is carefully consolidated with the asphalt 2 of the interior tube so that on subsequently assembling the tubes between them, it may be necessary to make the joints on the asphalt 43 covering the ends of the tubes in order that the water conveyed by the tubes may be always in contact with the layer of dry asphalt covering the interior, the extremities and the ends of the tubes.

Figures 12 and 13 show the apparatus for the mechanical application of the hot gravel and the various layers of cement on the asphalt tube and reinforced cement previously described.

The thickness gauge rings 70 are each formed or provided with a recess 71 with which the rollers 72 engage. The rollers 72 are supported in bearing blocks carried on blocks 73 which are secured on a platform or table 74. Handles 75 of any suitable number are screw-threaded into the outer side of a disc 76 rigidly secured to the gauging rings 70 and by means of the handles, the rings 70 and the extensible mandrel 77 rotated thereby can be slowly turned by hand or by a lever.

When the whole of the apparatus 79 is in place the rollers 80 engage in the recesses 71 in the gauging rings. These rollers have a plain edge when the thickness gauging rings are provided with a slot. The said rollers are provided with a groove when they are intended for use with the thickness gauging discs 20 or the like, the ridge side of the roller being disposed against the rim of the disc when provided for use in the manufacture of tubes with arch-like segments or elements of asphalt and reinforced cement.

The apparatus is maintained against the thickness gauging rings by springs 100 secured to the upper ends of the supports 82.

The lower part of the apparatus 79 is further supported on the table 81 provided with a stop 101. The apparatus is formed by two sheet metal supports 82, Figure 12, in which are fixed the spindles 83 of the rollers 80.

A cross beam 84 connects the two supports by means of angle irons or by means of a shaft 85. On this beam is placed a sheet of metal or a plate 86 with two slits 87 by means of which the desired distance of the smoothing board can be controlled as desired by screws 88, Figure 12, which permit of the smoothing board being displaced into any desired position.

Another cross beam 89 is secured likewise between the two supports 82 by the same means as the beam 84. On this cross beam 89 is placed a sheet of metal or a plate 90 having two openings which permit of the displacement or the adjustment of the smoothing board to the desired position by the aid of screws.

Above the two plates suitably adjusting screws may be provided and the inclination of the U-shaped cross beam which carries them may also be adjustable.

Below the aforesaid cross beams a screw 92 is adapted to be placed in a guide 93 at the lower part of each support 82. Nuts 94 are provided with holes 95 and permit of the advancement or withdrawal of the screws. A shaft 96 carrying a cylinder 97 is supported at each side in the ends of the screws 92.

The action of the apparatus is as follows:—

For the application of hot gravel, this gravel is run in front of the plate 86 which is adjusted to a suitable distance and while turning the mandrel and the tube the gravel abuts against the rolling cylinder 97 adjusted to a suitable distance in such manner that all the particles of the gravel or of the stones are rolled and have their exterior face at a uniform distance from the axis of the tube or pipe.

For the application of cement mortar, this cement mortar 98 is run in between the formed tube 78 and the plate 86 which is adjusted to any desired distance. This plate 86 forms a trowel throughout the length of the tube and by turning the mandrel the cement mortar is applied to the tube throughout its length to the desired thickness. The plate 90 adjusted to a suitable distance removes the excess of cement mortar and the cylinder 97 adjusted also to a suitable distance packs the cement mortar and renders the surface extremely uniform or homogeneous. All the operations are effected very rapidly throughout the length of the tube or pipe while the latter is slowly rotated on the rollers 72.

This method of manufacture of tubes presents many advantages which may be summed up as follows: Perfect fluid tightness under the highest pressures due to the interior asphalt wall as well as the asphalt applied on the extremities and the ends; extreme resistance due to the exterior wall of reinforced cement; perfect adhesion between the asphalt walls and the reinforced cement; possibility of making tubes of all diameters anywhere even at the bottom of trenches which avoids the cost of transport and the handling of the tubes; suppression of binding material between the metallic skeleton or framework and the convolutions or turns of the helically wound wire which forms the constructive ribs of the tubes; perfect centering of the convolutions or turns of the helically wound wire; great uniformity of the tubes ensured by the thickness gauging rings; great resistance to wear and tear due to the grains of sand, limestone or pieces of hard stone incorporated in the asphalt mastic or the asphaltic concrete forming a covering analogous to that of roadways of asphaltic concrete; lastly, considerable economy in the initial cost of material and working.

Having thus fully described the invention what is claimed as new and desired to be secured by Letters Patent is:—

1. The method of forming a concrete pipe consisting of applying a layer of asphalt about the core, arranging a metallic reinforcement about the layer, embedding mineral aggregate between the reinforcement and into the layer, wrapping a wire about the aggregate and reinforcement to retain the same, then dipping the product in a cementitious solution to bind the wrapping reinforcement mineral aggregate and layer, and finally applying a layer of solid cementitious material about the binding.

2. The method of making reinforced concrete pipes consisting in applying a layer of asphalt about a core, arranging a series of interconnected rods about the layer and parallel with the axis of the core, embedding mineral aggregate between the rods and about the asphalt layer, wrapping a wire about the mineral aggregate and rods so as to retain the same, then dipping the article in a solution of cementitious material to bind the wrapping mineral aggregate and rods with the first layer, applying a layer of solid reinforcement cementitious material about the binding and finally smoothing the outer layer.

3. A method as claimed in claim 2 including the step of temporarily applying gauging rings to the ends of the core to insure of the production of a smooth even surface on the first asphalt layer.

4. A method as claimed in claim 1 including the step of applying an isolating material about the core.

5. The method of forming concrete pipes consisting in applying an isolating material about a core, rolling the core through molten asphalt, applying reinforcing rods about the asphalt layer, rolling the core over mineral aggregate to embed the same in the asphalt layer, rotating the core and simultaneously wrapping a wire about the aggregate and rods, dipping the core into a bath of molten asphalt so as to bind the wire aggregate and inner layer together and finally applying a layer of solid cementitious material about the binding.

6. A method as claimed in claim 5 including the additional step of temporarily applying gauging rings to the ends of the core to effect a smooth even application of the inner layer.

7. A method as claimed in claim 5 including the additional step of extending the outer end of the core and reversely folding it to envelop the terminals of the outer layer.

8. Apparatus for carrying out the herein described method, comprising a platform, and spaced pairs of rotatable rollers thereon, a core, a pair of gauging rings having recesses for engagement with the rollers on the platform, a secondary support a trowel, a smoothing board, means for adjustably mounting the trowel and the smoothing board on the support, supporting rollers on the secondary support for engaging the recesses in the gauging rings, and a packing roller rearwardly of the smoothing board, as and for the purposes set forth.

9. The method of manufacturing articles composed of layers of asphalt and cement, consisting in embedding portions of a plurality of fragmentary mineral blocks in and bonding the portions so embedded to the asphalt layer by means of a hot bond produced by heating and embedding said blocks while in heated condition, and embedding in a cement layer the portions of such mineral blocks extending beyond the asphalt layer, said embedding being accomplished while the blocks and cement are cold to produce a cold bond therebetween, whereby a pressure-resisting adherence between the blocks and the asphalt layer on one side and a pressure-resisting adherence between the blocks and the cement layer on the other side are produced, and the asphalt and cement layers are anchored and bonded together by a pressure-resistant bond.

10. The method of manufacturing articles composed of layers of asphalt and cement, consisting in embedding portions of a plurality of fragmentary mineral blocks in and bonding them to the asphalt layer by means of a hot bond produced by heating the mineral blocks sufficiently to melt the asphalt adjacent to the portions of such blocks so embedded and embedding in a cement layer the portions of such mineral blocks extending beyond the asphalt layer, said embedding being accomplished while the blocks and cement are cold to produce a cold bond therebetween, thus to procure a thorough anchoring of the asphalt and cement layers together.

11. The method of manufacturing articles composed of layers of asphalt and cement consisting in heating asphalt and forming a layer thereof, partially embedding while the layer of asphalt is still hot a series of fragmentary mineral blocks heated to a sufficient degree to melt the asphalt adjacent thereto, and embedding in the cement layer the portions extending beyond the asphalt layer while the said block portions are in cold condition, whereby a pressure-resisting adherence between the blocks and the asphalt layer on one side and a pressure-resisting adherence between the blocks and the cement layer on the other side are produced, and the asphalt and cement layers are anchored and bonded together by a pressure-resistant bond.

12. The method of manufacturing articles composed of layers of asphalt and cement consisting in heating asphalt and forming a layer thereof, partially embedding while the layer of asphalt is still hot a series of fragmentary mineral blocks heated to a sufficient degree to melt upon such embedding the asphalt adjacent thereto, then wetting with water the projecting portions of the blocks to cool the same and then embedding the projecting cooled portions extending beyond the asphalt layer in a layer of cement, whereby a pressure-resisting adherence between the blocks and the asphalt layer on one side and a pressure-resisting adherence between the blocks and the cement layer on the other side are produced, and the asphalt and cement layers are anchored and bonded together by a pressure-resistant bond.

13. An article of manufacture composed of a layer of asphalt and a layer of cement connected together by fragmentary mineral blocks embedded partially in one layer, and partially in the other, the blocks and the asphalt layer having a strong, pressure-resistant bond produced by heating the blocks to a temperature sufficient to cause a melting of the asphalt adjacent to the embedded portion of the blocks upon such partial embedding, and the cement layer and said blocks having a bond produced while both the cement layer and blocks are in a cold state.

14. An article of manufacture composed of a layer of asphalt and a layer of cement connected together by fragmentary mineral blocks embedded partially in one layer, and partially in the other, the blocks and the asphalt layer having a strong, pressure-resistant bond produced by partially embedding in hot asphalt blocks heated sufficiently to melt the asphalt adjacent to the embedded portions upon such partially embedding, and the cement layer and said blocks having a bond produced while both the cement layer and blocks are in a cold state.

15. The method of manufacturing hollow articles composed of layers of asphaltic mortar and cement consisting in forming one of such layers into tubular conformation, partially embedding in the layer so formed a layer of mineral fragmentary blocks, and applying the other layer of material over the projecting portions of the partially embedded mineral fragmentary blocks and during such steps producing a hot bond between such mineral fragmentary blocks and the asphaltic mortar layer by heating the said fragmentary blocks.

16. The method of manufacturing hollow articles composed of layers of asphaltic mortar and cement consisting in forming one of such layers into tubular conformation, partially embedding in the layer so formed a layer of mineral fragmentary blocks, applying the other layer of material over the projecting portions of the partially embedded mineral fragmentary blocks and during such steps producing a hot bond between such mineral fragmentary blocks and the asphaltic mortar layer by heating said mineral fragmentary blocks sufficiently to melt the asphalt adjacent thereto and also during such steps producing a cold bond between said mineral fragmentary blocks and cement layer.

17. In a method of producing fluid-tight pipes composed of inner and outer layers of asphaltic mortar and cement, the steps of forming one of such layers into tubular conformation, then simultaneously rotating the tube so formed and partially embedding therein a layer of mineral fragmentary blocks and then applying a layer of the other material over such partially embedded fragmentary blocks to form the completed pipe, said mineral fragmentary blocks being heated and embedded while hot in the asphalt layer.

18. In a method of producing fluid-tight pipes composed of inner and outer layers of asphaltic mortar and cement, the steps of forming one of such layers into tubular conformation, simultaneously rotating the tube so formed and partially embedding therein a layer of mineral fragmentary blocks and applying a layer of the other material over such partially embedded fragmentary blocks to form the completed pipe, and during said steps producing a hot bond between such mineral fragmentary blocks and the asphaltic mortar layer by heating said mineral fragmentary blocks sufficiently to melt the asphalt adjacent thereto.

19. An article of manufacture composed of a tubular layer of asphalt and a tubular layer of cement connected together by fragmentary mineral blocks embedded partially in one layer and partially in the other, said blocks and said tubular asphalt layer having a strong pressure-resistant bond produced by embedding in the tubular asphalt layer the said mineral fragmentary blocks in hot condition and the cement layer and said blocks having a bond produced while both the cement layer and blocks are in a cold state.

LÉON BILLÉ.